United States Patent
Umesh et al.

(10) Patent No.: US 8,073,404 B2
(45) Date of Patent: Dec. 6, 2011

(54) MOBILE COMMUNICATION METHOD, MOBILE STATION AND BASE STATION

(75) Inventors: Anil Umesh, Yokohama (JP); Masafumi Usuda, Tokyo (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 666 days.

(21) Appl. No.: 11/662,901

(22) PCT Filed: Sep. 16, 2005

(86) PCT No.: PCT/JP2005/017195
§ 371 (c)(1),
(2), (4) Date: Jul. 5, 2007

(87) PCT Pub. No.: WO2006/030916
PCT Pub. Date: Mar. 23, 2006

(65) Prior Publication Data
US 2007/0254621 A1    Nov. 1, 2007

(30) Foreign Application Priority Data

Sep. 17, 2004   (JP) ............................... P2004-272402
Sep. 17, 2004   (JP) ............................... P2004-272408

(51) Int. Cl.
*H03C 7/02*    (2006.01)

(52) U.S. Cl. ...................................................... 455/101

(58) Field of Classification Search .................. None
See application file for complete search history.

(56) References Cited

U.S. PATENT DOCUMENTS

| | | | | |
|---|---|---|---|---|
| 6,862,434 | B2 * | 3/2005 | Wallace et al. | 455/101 |
| 7,146,171 | B2 * | 12/2006 | Tang et al. | 455/450 |
| 7,206,353 | B2 * | 4/2007 | Kim et al. | 375/267 |
| 2002/0044591 | A1 * | 4/2002 | Lee et al. | 375/130 |
| 2002/0186779 | A1 * | 12/2002 | Gollamudi | 375/267 |
| 2003/0017835 | A1 * | 1/2003 | Bergel | 455/502 |
| 2003/0043946 | A1 * | 3/2003 | Kim et al. | 375/358 |
| 2003/0060236 | A1 * | 3/2003 | Kim et al. | 455/562 |
| 2003/0228850 | A1 * | 12/2003 | Hwang | 455/101 |
| 2004/0082356 | A1 * | 4/2004 | Walton et al. | 455/522 |

(Continued)

FOREIGN PATENT DOCUMENTS

EP      1 204 219 A2    5/2002

(Continued)

OTHER PUBLICATIONS

Wichman et al., International Journal of Wireless Information Networks, vol. 6, No. 3, pp. 171-180, 1999.*

(Continued)

*Primary Examiner* — Yuwen Pan
*Assistant Examiner* — Ayodeji Ayotunde
(74) *Attorney, Agent, or Firm* — Marvin A. Motsenbocker; Mots Law, PLLC

(57) ABSTRACT

An object of the present invention is to specify how a transmission diversity station that implements an EUL should apply a transmission antenna diversity to an E-HICH, an E-RGCH and an E-AGCH. The present invention relates to a mobile communication method for transmitting a signal from a base station to a mobile station via a downlink. In the method, a closed loop transmission antenna diversity is applied to a dedicated channel of the downlink, and an open loop transmission antenna diversity is applied to a control channel of the downlink in conformity with an uplink high efficient transmission method.

6 Claims, 12 Drawing Sheets

U.S. PATENT DOCUMENTS

2004/0242187 A1* 12/2004 Doi et al. .................. 455/403
2005/0003768 A1* 1/2005 Laroia et al. ............... 455/101
2005/0095997 A1* 5/2005 Horng ....................... 455/101

FOREIGN PATENT DOCUMENTS

WO 00/79701 A1 12/2000
WO 02/27972 A2 4/2002

OTHER PUBLICATIONS

3GPP TS 25.211 V6.0.0 (Dec. 2003), p. 17 to 18, $3^{rd}$ Generation Partnership Project; Technical Specification Group Radio Access Network; Physical channels and mapping of transport channels onto physical channels (FDD), (Release 6).

3GPP TS 25.211 V6.6.0 (Sep. 2005), pp. 17 to 18, $3^{rd}$ Generation Partnership Project; Technical Specification Group Radio Access Network; Physical channels and mapping of transport channels onto physical channels (FDD), (Release 6).

Official Action Letter issued on Jul. 21, 2008 in the counterpart Korean patent application.

Search Report issue on Jul. 28, 2008 in the counterpart European patent application.

"Universal Mobile Telecommunications System (UMTS); Physical channels and mapping of transport channels onto physical channels (FDD) (3GPP TS 25.211 version 6.0.0 Release 6), ETSI TS 125 211," ETSI Standards, LIS, Sophia Antipolis Cedex, France, vol. 3-R1, No. V6.0.0. Dec. 1, 2003, XP014016682.

The office communication of Mar. 17, 2011, issued in the counterpart Chinese patent application.

* cited by examiner

PRIOR ART

FIG. 13

| MODE | $N_{FBD}$ | $N_W$ | FREQUENCY OF UPDATE | FEEDBACK BIT RATE | $N_{po}$ | $N_{ph}$ |
|---|---|---|---|---|---|---|
| 1 | 1 | 1 | 1500 Hz | 1500 bps | 0 | 1 |
| 2 | 1 | 4 | 1500 Hz | 1500 bps | 1 | 3 |

MOBILE COMMUNICATION METHOD, MOBILE STATION AND BASE STATION

TECHNICAL FIELD

The present invention relates to a mobile communication method, a mobile station and a base station for improving communication performance (such as a communication capacity and radio communication quality) of a mobile communication system.

Particularly, this invention relates to techniques applicable to a "W-CDMA" system and a "CDMA2000" system which are third generation mobile communication systems.

BACKGROUND ART

Generally, in a mobile communication system, transmission and reception of signals are performed via radio links (or a downlink and an uplink) between a mobile station and a base station.

As shown in FIG. 1, a base station Node-B transmits a signal to a mobile station UE via a downlink (DL), and the mobile station UE transmits a signal to the base station Node-B via an uplink (UL).

Specifically, the base station Node-B and the mobile station UE use various channels set up on the downlink and the uplink, respectively, for signal transmission.

For the signal transmission via the downlink, the base station Node-B configured to use two antennas to divide transmission power into equal halves and transmit downlink signals (or DL signals) as shown in FIG. 2(*b*) can improve radio communication quality, as compared to that configured to simply use a single antenna to transmit a downlink signal (or a DL signal) as shown in FIG. 2(*a*).

Herein, the configuration shown in FIG. 2(*b*) is called a "transmission antenna diversity", and the base station Node-B that implements the transmission antenna diversity is called a "transmission diversity station".

The transmission antenna diversities fall into two broad categories: an "open loop transmission antenna diversity" shown in FIG. 3(*a*) and a "closed loop transmission antenna diversity" shown in FIG. 3(*b*).

For the purpose of improving the radio communication quality, there are also a plurality of systems in which the transmission diversity station (or the base station Node-B) applies different signal patterns, different weights of transmission power, and the like to two antennas, when transmitting downlink signals with the two antennas.

As employed herein, the "open loop transmission antenna diversity" shown in FIG. 3(*a*) is the system that does not require feedback information from the mobile station UE by applying predetermined signal patterns, predetermined weights of transmission power, and the like.

The "closed loop transmission antenna diversity" shown in FIG. 3(*b*) is the system that regularly receives optimum signal patterns, optimum weights of transmission power, and the like, as feedback information, from the mobile station UE according to the status of radio.

Generally, the "closed loop transmission antenna diversity" is applied to dedicated channels of each mobile station UE, because the application of the "closed loop transmission antenna diversity" can achieve an improvement in the radio communication quality, as compared to the application of the "open loop transmission antenna diversity".

In contrast, the "open loop transmission antenna diversity" is applied to a common channel through which a plurality of mobile stations UE receive signals, because the common channel cannot be adapted to feedback information from a specific mobile station UE.

In the third generation mobile communication system "W-CDMA" system whose specifications are being standardized by the international organization for standardization "3GPP", physical channels having specifications already standardized include a dedicated channel (DPDCH: Dedicated Physical Data Channel) that acts to transmit a data signal dedicated to each mobile station, and a dedicated channel (DPCCH: Dedicated Physical Control Channel) that acts to transmit a control signal dedicated to each mobile station associated with the DPDCH.

As shown in FIG. 4, communications between the mobile station UE and the base station Node-B are accomplished, by setting the DPDCH/DPCCH for the uplink and the downlink, bidirectionally.

According to specifications standardized by the 3GPP, the transmission antenna diversity can be implemented in the base station Node-B.

Specifically, the "STTD (Space Time block coding based Transmission antenna Diversity)" which is a type of open loop transmission antenna diversity, and the "CL TxDiv mode-1 (Closed Loop Transmission diversity mode-1)" or the "CL TxDiv mode-2" which is a type of open loop transmission antenna diversity, can be applied to the downlink DPDCH/DPCCH. The "CL TxDiv mode-1" and the "CL TxDiv mode-2" will hereinafter be collectively called "CL TxDiv".

Generally, the "CL TxDiv" is applied to the downlink DPDCH/DPCCH, because the application of the "CL TxDiv" can achieve an improvement in the radio communication quality, as compared to the application of the "STTD".

[Non-patent Document 1] "3GPP TS 25.211 v6.0.0," December 2003

In addition, the 3GPP promotes the study of an "uplink high efficient transmission method (EUL: Enhanced Up Link)", in order to enhance the efficiency of data signal transmission via the uplink.

As a result, there is a trend toward the additional provision of an "ACKCH (ACK CHannel)", specifically, an "E-HICH (E-DCH HARQ Acknowledgement Indicator Channel)", as a downlink control channel in conformity with the EUL. Incidentally, the E-HICH is a physical channel that acts to transmit layer-1 acknowledgement information dedicated to each mobile station UE.

There is also a trend toward the additional provision of an "E-RGCH (Enhanced Relative Grant CHannel)" and an "E-AGCH (Enhanced Absolute Grant CHannel)", as downlink control channels in conformity with the EUL. Incidentally, the E-RGCH and E-AGCH are dedicated physical channels that act to transmit uplink rate assignment channel dedicated to each mobile station UE.

Although the transmission diversity station has to apply the transmission antenna diversity to all downlink channels, the 3GPP does not give specifications that define how the transmission antenna diversity should be applied to the E-HICH, the E-RGCH and the E-AGCH.

DISCLOSURE OF THE INVENTION

The present invention has been made in consideration of the foregoing problems. An object of the present invention is to provide a mobile communication method, a mobile station and a base station, which are designed to specify how a transmission diversity station that implements the EUL should apply a transmission antenna diversity to an E-HICH, an E-RGCH and an E-AGCH.

A first aspect of the present invention is summarized as a mobile communication method for transmitting a signal from a base station to a mobile station via a downlink; wherein a closed loop transmission antenna diversity is applied to a dedicated channel of the downlink, and an open loop transmission antenna diversity is applied to a control channel of the downlink in conformity with an uplink high efficient transmission method.

In the first aspect of the present invention, the control channel of the downlink can be a physical channel for transmitting layer-1 acknowledgement information dedicated to each mobile station; and the open loop transmission antenna diversity can be STTD.

In the first aspect of the present invention, the control channel of the downlink can be an dedicated physical channel for transmitting uplink rate assignment information dedicated to each mobile station; and the open loop transmission antenna diversity can be STTD.

A second aspect of the present invention is summarized as a mobile station to which a signal is transmitted from a base station via a downlink, wherein the mobile station is configured to receive dedicated channels of the downlink to which a closed loop transmission antenna diversity is applied; and the mobile station is configured to receive a control channel of the downlink in conformity with an uplink high efficient transmission method, to which an open loop transmission antenna diversity is applied.

In the second aspect of the present invention, the control channel of the downlink can be a physical channel for transmitting layer-1 acknowledgement information dedicated to each mobile station; and the open loop transmission antenna diversity can be STTD.

In the second aspect of the present invention, a control channel of the downlink can be a dedicated physical channel for transmitting uplink rate assignment information dedicated to each mobile station; and the open loop transmission antenna diversity can be STTD.

A third aspect of the present invention is summarized as a base station for transmitting a signal to a mobile station via a downlink, wherein the base station is configured to apply a closed loop transmission antenna diversity to dedicated channels of the downlink; and the base station is configured to apply an open loop transmission antenna diversity to a control channel of the downlink in conformity with an uplink high efficient transmission method.

In the third aspect of the present invention, the control channel of the downlink can be a physical channel for transmitting layer-1 acknowledgement information dedicated to each mobile station; and the open loop transmission antenna diversity can be STTD.

In the third aspect of the present invention, the control channel of the downlink can be a dedicated physical channel for transmitting uplink rate assignment information dedicated to each mobile station; and the open loop transmission antenna diversity can be STTD.

BRIEF DESCRIPTION OF THE DRAWINGS

FIG. 13 is a table showing specifications of two modes of a closed loop transmission diversity.

BEST MODE FOR CARRYING OUT THE INVENTION

Figure 1:
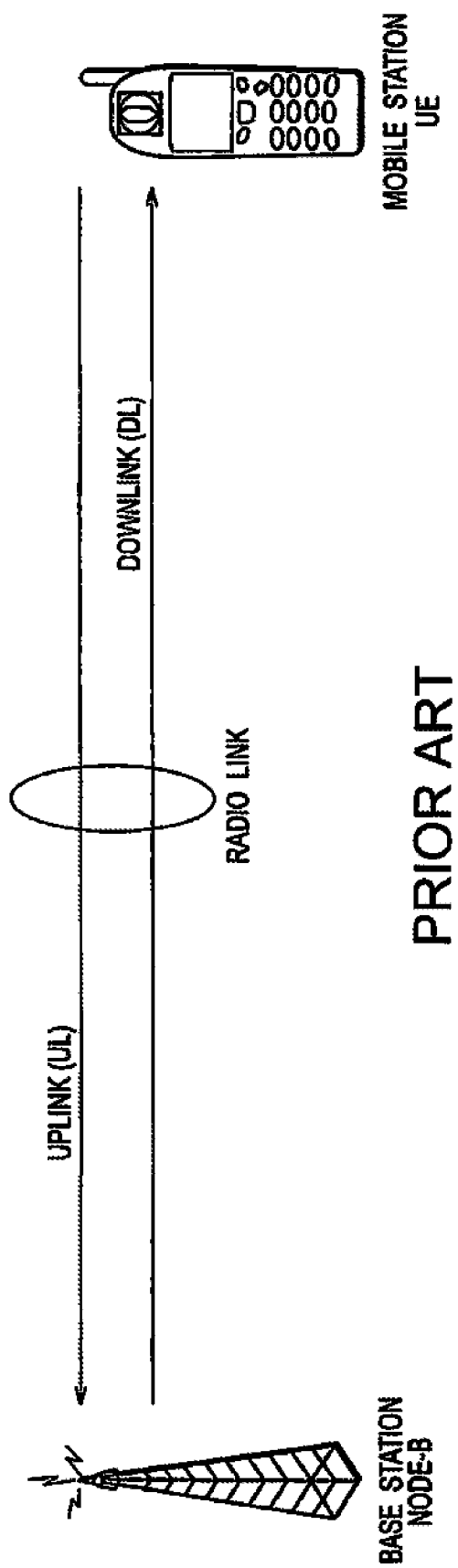
FIG. 1 is an illustration showing a situation where signals are transmitted and received between a mobile station and a base station, in a general mobile communication system.
Figure 2A:
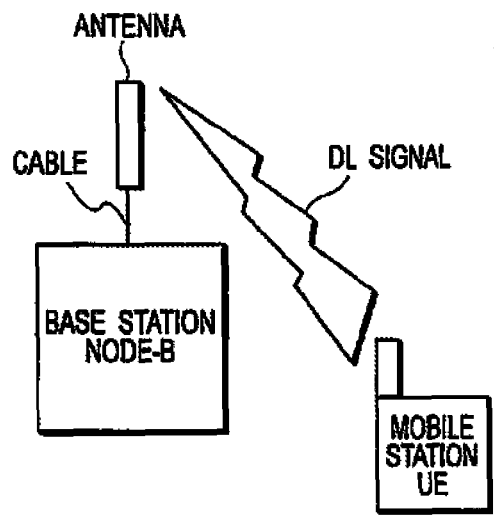
FIG. 2 are illustrations for explaining a general transmission antenna diversity.
Figure 2B:
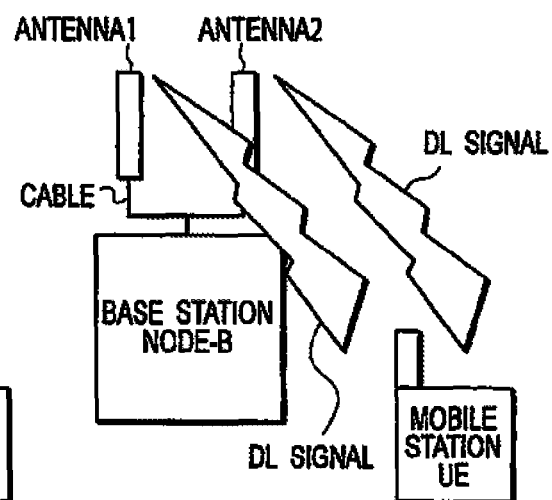
Figure 3A:
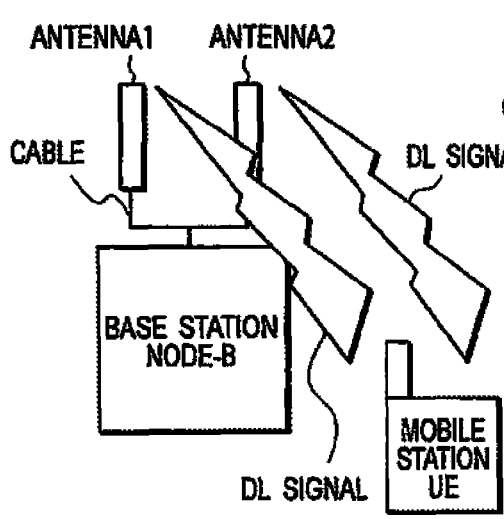
FIG. 3 are illustrations for explaining a general open loop transmission antenna diversity and a general closed loop transmission antenna diversity.
Figure 3B:
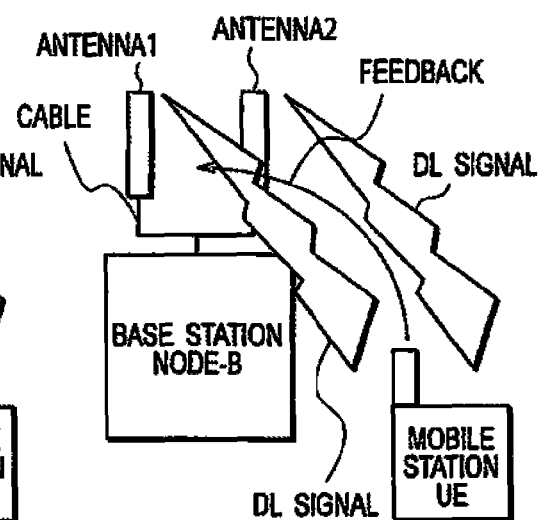
Figure 4:
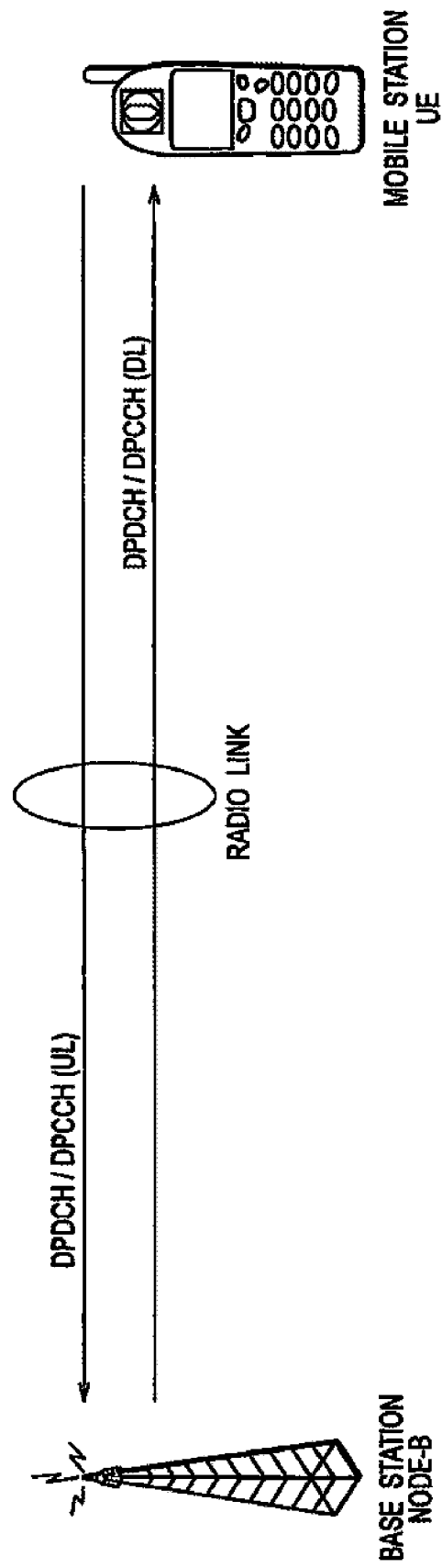
FIG. 4 is an illustration showing a situation where DPDCH and DPCCH are set up between the mobile station and the base station, in the general mobile communication system.
Figure 5:
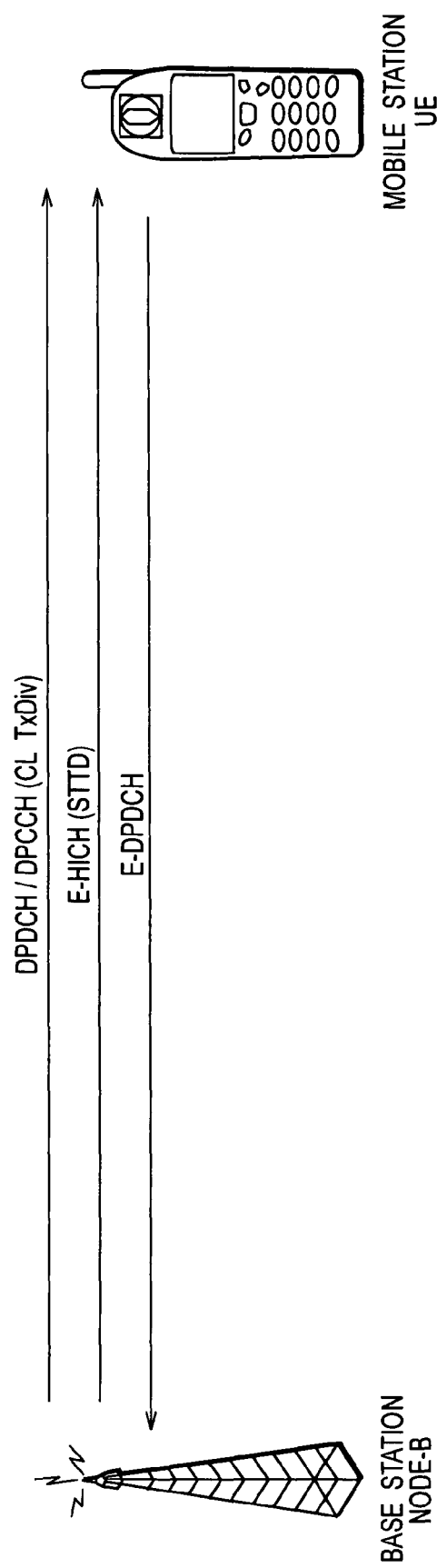
FIG. 5 is an illustration showing examples of downlink and uplink channels transmitted and received in a mobile communication method according to a first embodiment of the present invention.

A Mobile Communication System According to a First Embodiment of the Present Invention FIG. 5 illustrates a method for applying a transmission antenna diversity to downlink channels in the mobile communication system according to the first embodiment of the present invention. In the mobile communication system according to the first embodiment, the EUL is applied to an uplink between a base station Node-B and a mobile station UE.

As shown in FIG. 5, the mobile station UE is transmitting dedicated data signal to the base station Node-B through an E-DPDCH (Enhanced DPDCH) in the uplink.

The base station Node-B is transmitting a dedicated data signal and a dedicated control signal to each mobile station UE through a DPDCH and a DPCCH, respectively, in the downlink.

Herein, the base station Node-B implements the transmission antenna diversity and applies "CL TxDiv" to the downlink DPDCH/DPCCH.

In addition, the base station Node-B is transmitting a dedicated E-HICH to each mobile station in the downlink, since the EUL is applied to the uplink.

Herein, the E-HICH is a physical channel that acts to transmit layer 1 acknowledgement channel dedicated to each mobile station. For example, the E-HICH is configured to transmit "ACK/NACK" as an E-DPDCH acknowledgement signal.

The "CL TxDiv" should be applied to the E-HICH as in the case of the DPDCH/DPCCH, since the E-HICH originally transmits a signal dedicated to each mobile station.

Figure 6:
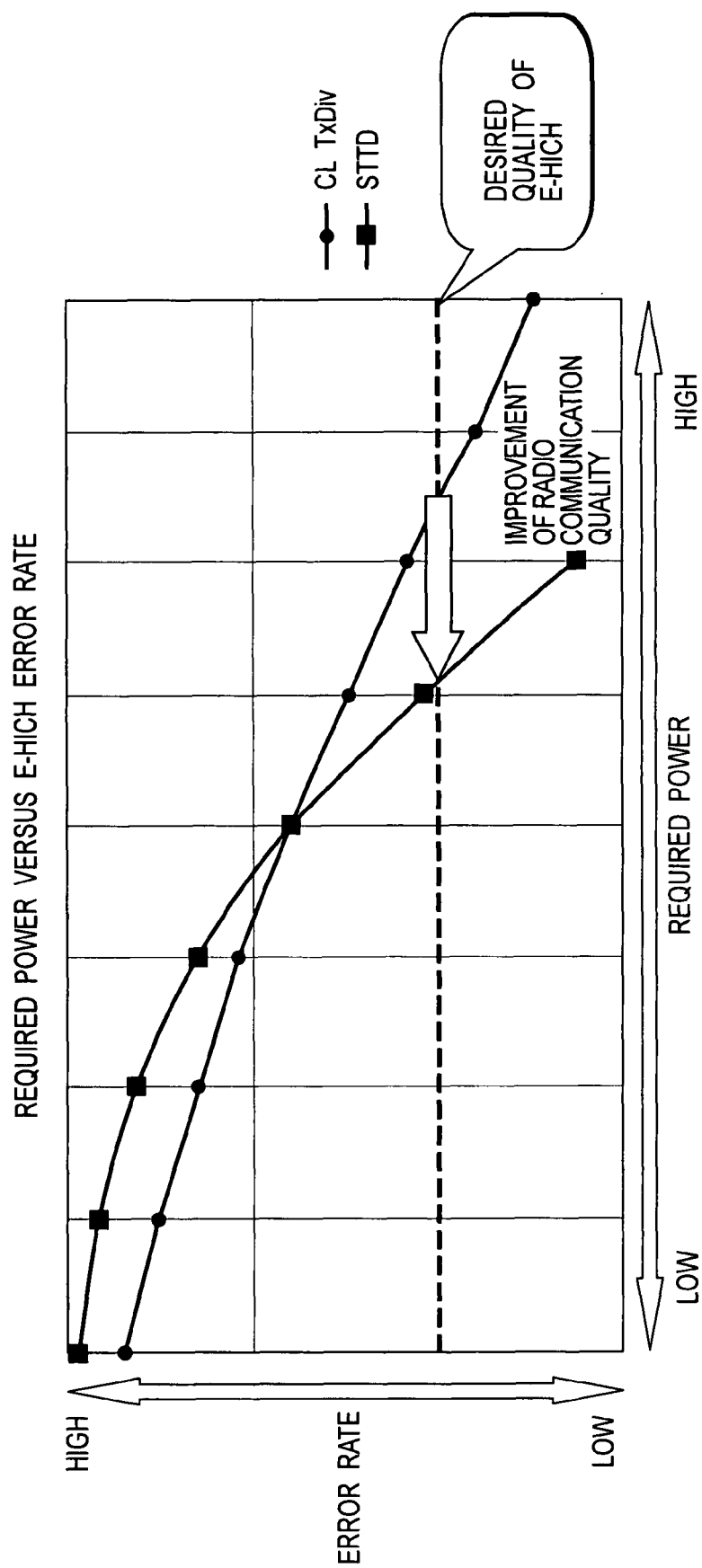
FIG. 6 is a graph showing the improvement of radio communication quality by the mobile communication method according to the first embodiment of the present invention.

However, as shown in FIG. 6, due to the nature of coding, it is possible to achieve a further improvement in radio communication quality by applying the "CL TxDiv" to the E-HICH in the region with a high error rate, and it is possible to achieve a further improvement in radio communication quality by applying the "STTD" to the E-HICH in the region with a low error rate.

The "STTD" rather than the "CL TxDiv" is applied to the E-HICH, so as to enable achieving a further improvement in the radio communication quality, since due to its nature the E-HICH needs to be operated in the region with a low error rate.

Consequently, the base station (or a transmission diversity station), even when applying the "CL TxDiv" to the downlink DPDCH/DPCCH, applies the "STTD" to the E-HICH, thereby makes it possible to improve the radio communication quality in the E-HICH, and thus achieves an increase in the capacity of the mobile communication system.

A Mobile Communication System According to a Second Embodiment of the Present Invention Description will be given with reference to FIGS. 7 and 8 with regard to the mobile communication system according to the second embodiment of the present invention.

Figure 7:
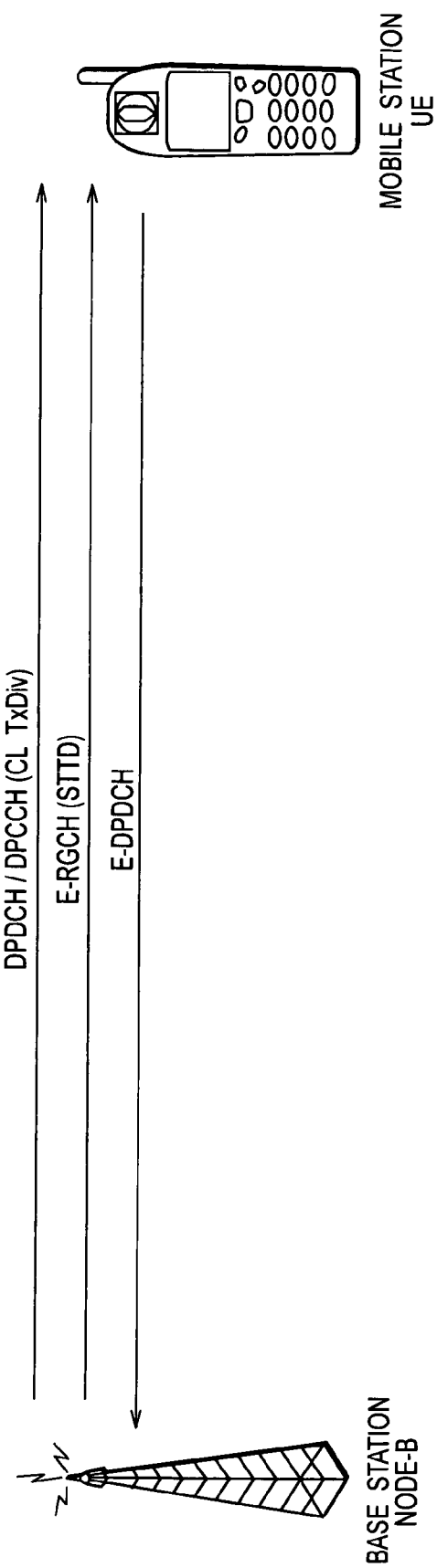
FIG. 7 is an illustration showing examples of downlink and uplink channels transmitted and received in a mobile communication method according to a second embodiment of the present invention.

FIG. 7 illustrates a method for applying a transmission antenna diversity to downlink channels in the mobile communication system according to the second embodiment of the present invention. Also in the mobile communication system according to the second embodiment, the EUL is applied to an uplink between a base station Node-B and a mobile station UE, as in the case of the mobile communication system according to the first embodiment described above.

Specifically, as shown in FIG. 7, the mobile station UE is transmitting a dedicated data signal to the base station Node-B through an E-DPDCH, in the uplink. The base station Node-B is transmitting a dedicated data signal and a dedicated control signal to each mobile station UE through a DPDCH and a DPCCH, respectively, in the downlink. The base station Node-B implements the transmission antenna diversity and applies "CL TxDiv" to the downlink DPDCH/DPCCH.

In addition, the base station Node-B is transmitting a dedicated E-RGCH to each mobile station in the downlink, since the EUL is applied to the uplink.

Herein, the E-RGCH is a dedicated physical channel that acts to transmit uplink rate assignment information dedicated to each mobile station. Specifically, the E-RGCH is configured to notify each mobile station of a relative transmission rate (up/down/keep) that directs each mobile station to increase, decrease or keep the transmission rate of uplink user data. Incidentally, the transmission rates of the uplink user data include a transmission data block size (or a maximum transmission data block size) of the uplink user data, and a transmission power ratio (or a maximum transmission power ratio) between the E-DPDCH and the DPCCH.

The "CL TxDiv" should be applied to the E-RGCH as in the case of the DPDCH/DPCCH, since the E-RGCH originally transmits a signal dedicated to each mobile station.

Figure 8:
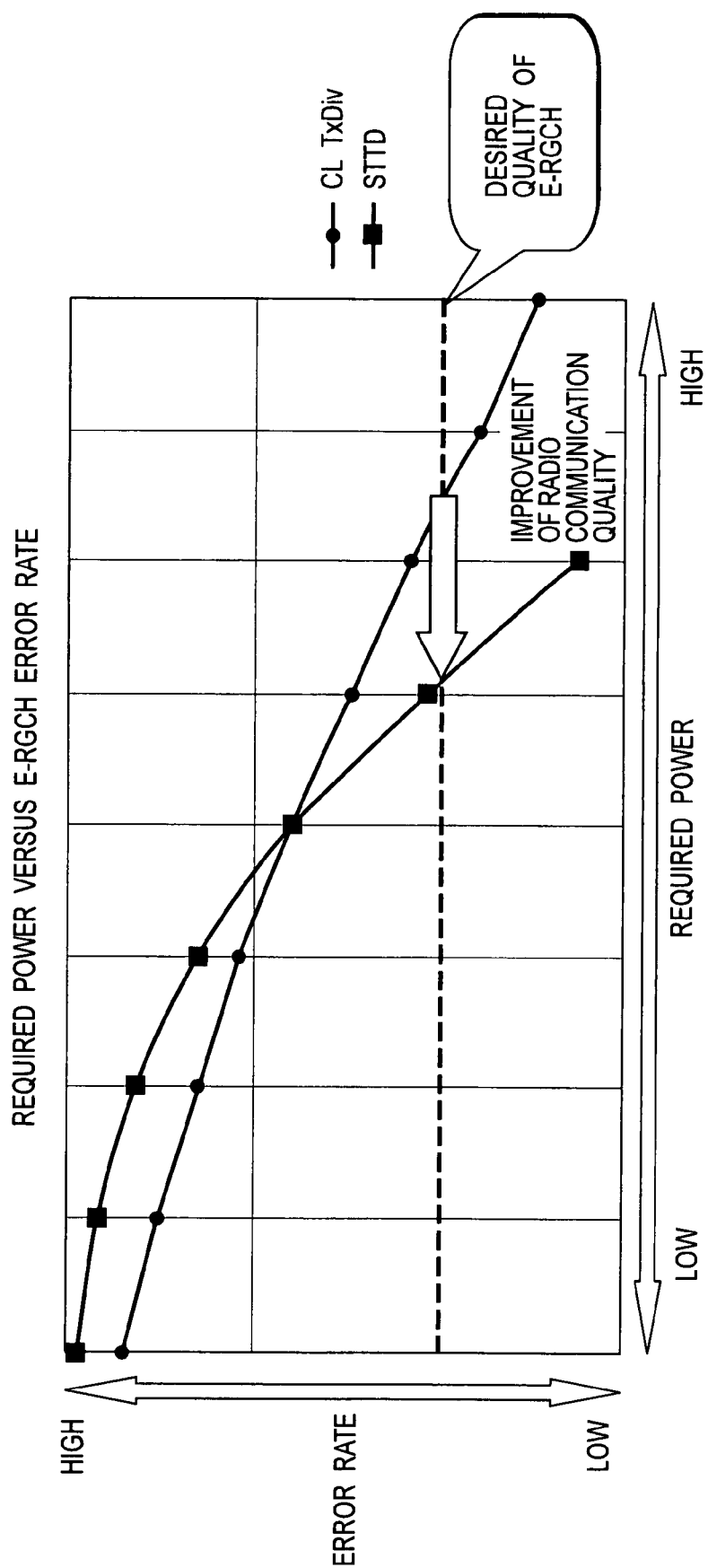
FIG. 8 is a graph showing the improvement of radio communication quality by the mobile communication method according to the second embodiment of the present invention.

However, as shown in FIG. 8, due to the nature of coding, it is possible to achieve a further improvement in radio communication quality by applying the "CL TxDiv" to the E-RGCH in the region with a high error rate, and it is possible to achieve a further improvement in radio communication quality by applying the "STTD" to the E-RGCH in the region with a low error rate.

The "STTD" rather than the "CL TxDiv" is applied to the E-RGCH, so as to enable achieving a further improvement in the radio communication quality, since due to its nature the E-RGCH needs to be operated in the region having a low error rate.

The E-RGCH is sometimes transmitted at shorter transmission time intervals TTI, as compared to the downlink DPDCH. Consequently, the application of the "STTD" capable of achieving a diversity effect makes it possible to achieve a further improvement in the radio communication quality.

Accordingly, the base station (or a transmission diversity station), even when applying the "CL TxDiv" to the downlink DPDCH/DPCCH, applies the "STTD" to the E-RGCH, thereby makes it possible to improve the radio communication quality in the E-RGCH, and thus achieves an increase in the capacity of the mobile communication system.

A Mobile Communication System According to a Third Embodiment of the Present Invention Description will be given with reference to FIGS. 9 and 10 with regard to the mobile communication system according to the third embodiment of the present invention.

Figure 9:
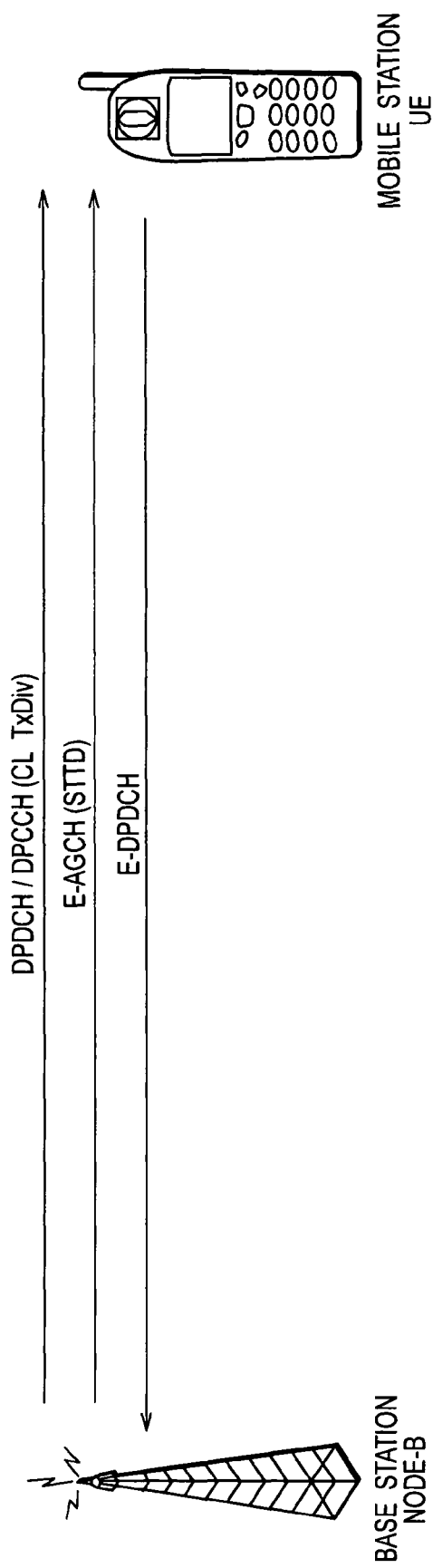
FIG. 9 is an illustration showing examples of downlink and uplink channels transmitted and received in a mobile communication method according to a third embodiment of the present invention.

FIG. 9 illustrates a method for applying a transmission antenna diversity to downlink channels in the mobile communication system according to the third embodiment of the present invention. Also in the mobile communication system according to the third embodiment, the EUL is applied to an uplink between a base station Node-B and a mobile station UE, as in the case of the mobile communication systems according to the first and second embodiments described above.

Specifically, as shown in FIG. 9, the mobile station UE is transmitting a dedicated data signal to the base station Node-B through an E-DPDCH, in the uplink. The base station Node-B is transmitting a dedicated data signal and a dedicated control signal to each mobile station UE through a DPDCH and a DPCCH, respectively, in the downlink. The base station Node-B implements the transmission antenna diversity and applies "CL TxDiv" to the downlink DPDCH/DPCCH.

In addition, the base station Node-B is transmitting a dedicated E-AGCH to each mobile station in the downlink, since the EUL is applied to the uplink.

Herein, the E-AGCH is a dedicated physical channel that acts to transmit uplink rate assignment information dedicated to each mobile station. Specifically, the E-AGCH is configured to notify each mobile station of an absolute transmission rate indicating the transmission rate of uplink user data (or information indicative of the transmission rate). Incidentally, the transmission rates of the uplink user data include the transmission data block size (or the maximum transmission data block size) of the uplink user data, and the transmission power ratio (or the maximum transmission power ratio) between the E-DPDCH and the DPCCH.

The "CL TxDiv" should be applied to the E-AGCH as in the case of the DPDCH/DPCCH, since the E-AGCH originally transmits a signal dedicated to each mobile station.

Figure 10:
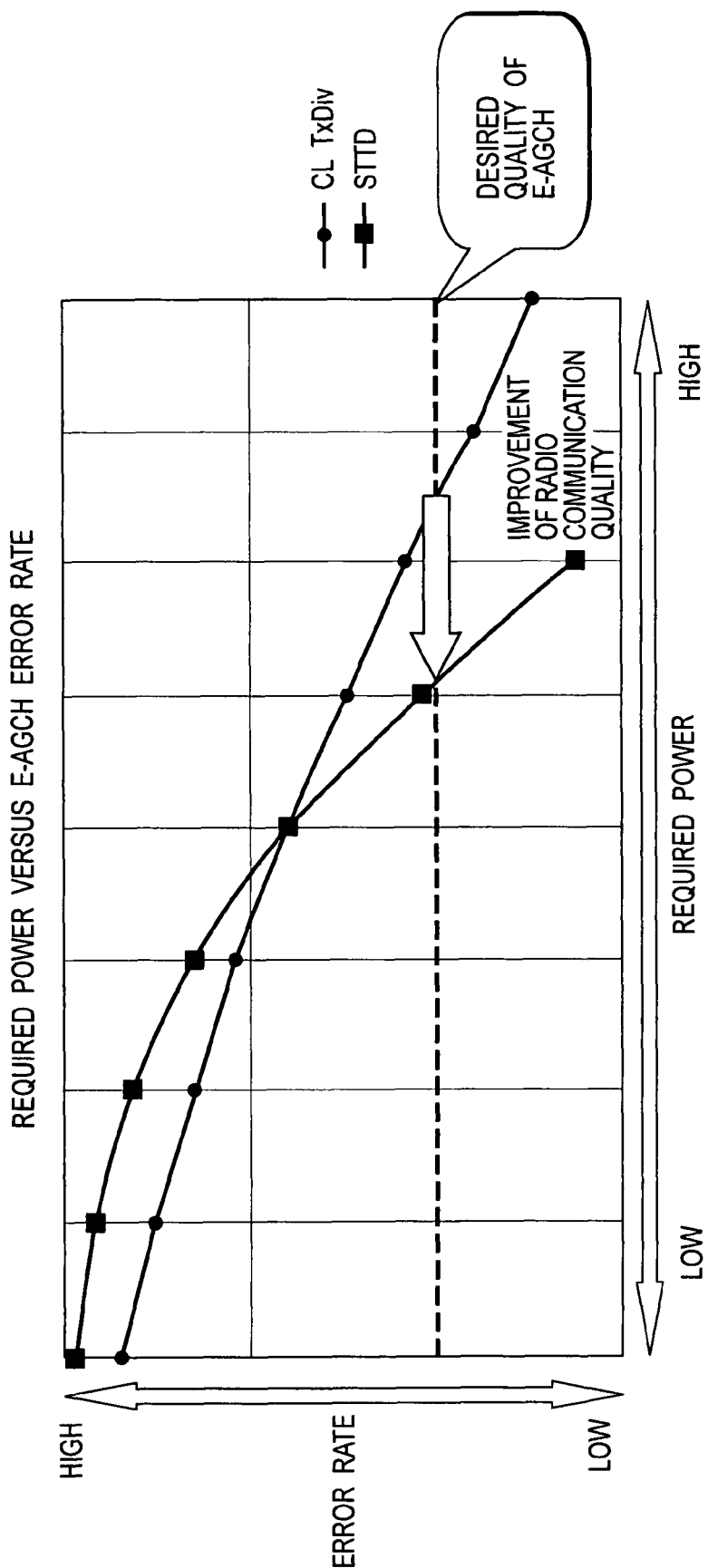
FIG. 10 is a graph showing the improvement of radio communication quality by the mobile communication method according to the third embodiment of the present invention.

However, as shown in FIG. 10, due to the nature of coding, it is possible to achieve a further improvement in radio communication quality by applying the "CL TxDiv" to the E-AGCH in the region with a high error rate, and it is possible to achieve a further improvement in radio communication quality by applying the "STTD" to the E-AGCH in the region with a low error rate.

The "STTD" rather than the "CL TxDiv" is applied to the E-AGCH, so as to enable achieving a further improvement in the radio communication quality, since due to its nature the E-AGCH needs to be operated in the region having a low error rate.

The E-AGCH is sometimes transmitted at shorter transmission time intervals TTI, as compared to the downlink DPDCH. Consequently, the application of the "STTD" which is capable of achieving the diversity effect makes it possible to achieve a further improvement in the radio communication quality.

Accordingly, the base station (or a transmission diversity station), even when applying the "CL TxDiv" to the downlink DPDCH/DPCCH, applies the "STTD" to the E-AGCH, thereby makes it possible to improve the radio communication quality in the E-AGCH, and thus achieves an increase in the capacity of the mobile communication system.

(Specific Description of the Transmission Antenna Diversity for Use in the Mobile Communication Systems According to Any One of the First to Third Embodiments of the Present Invention)

The specific description will be provided below with reference to FIGS. 11 to 13, with regard to the transmission antenna diversity for use in the mobile communication systems according to any one of the first to third embodiments of the present invention.

In the mobile communication systems according to the embodiments described above, the "STTD" is used as a type of transmission diversity in open loop mode. The "STTD" can achieve the diversity effect by use of two antennas.

The "STTD" is diversity technology that makes it possible to perform a maximum ratio combining diversity for signals from two antennas, by manipulating symbol patterns of an antenna #2 of the base station Node-B. In this case, error correcting coding, rate matching and interleaving take place as in the case where the "STTD" is not applied.

Figure 11:
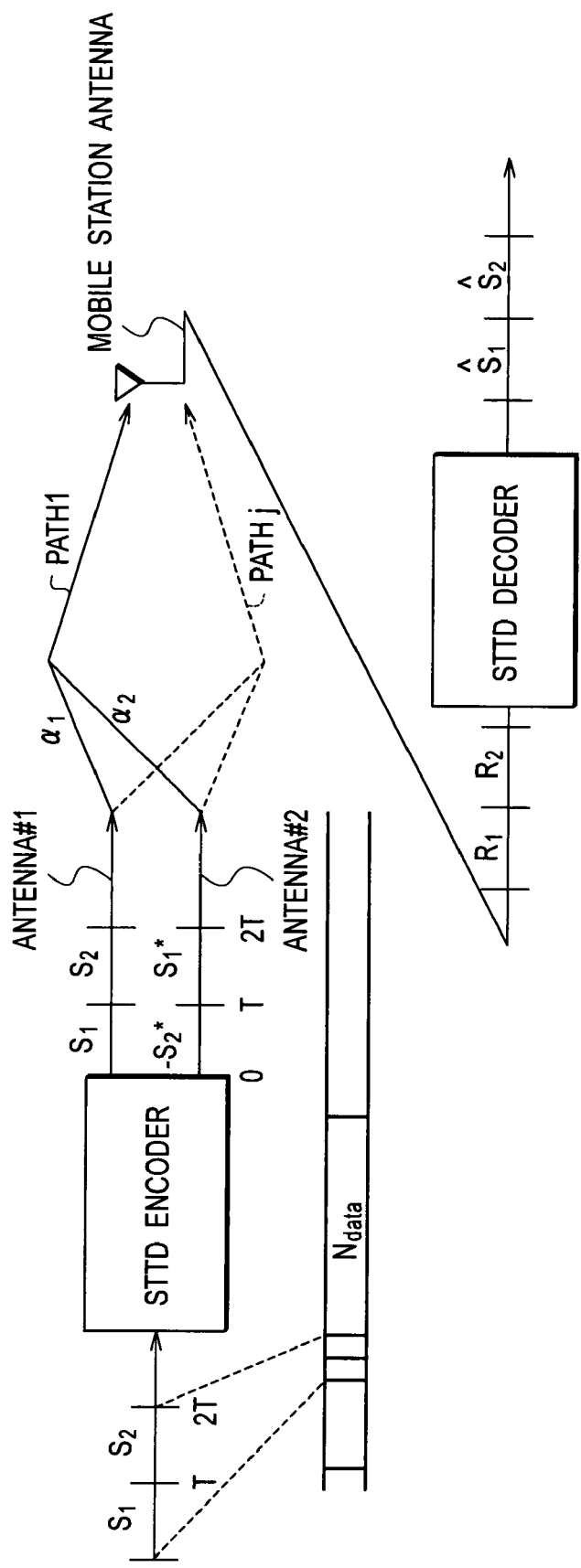
FIG. 11 is a diagram of the general configuration of the mobile communication system to which "STTD" is applied.

FIG. 11 shows the general configuration of an STTD encoder and an STTD decoder. In FIG. 11, $\alpha_1$ and $\alpha_2$ denote fading vectors of propagation paths extending from antennas #1 and #2, respectively.

As shown in FIG. 11, in the STTD encoder, when two symbols ($S_1$, $S_2$) are outputted to the antenna #1, two symbols ($-S_2^*$, $S_1^*$) are outputted to the antenna #2. Specifically, the STTD encoder reverses the two symbols ($S_1$, $S_2$) in time, represents the symbols as conjugate complex numbers, reverses the polarity of the odd-numbered symbol, and outputs the resultant symbols to the antenna #2.

Consequently, a mobile station antenna at the receiving side obtains received values $R_1$ and $R_2$ as follows (Here, it is assumed that the affects of noise and interference are neglected).

$$R_1 = \alpha_1 S_1 - \alpha_2 S_2^*$$

$$R_2 = \alpha_1 S_2 + \alpha_2 S_1^* \qquad \text{[Equation 1]}$$

The STTD decoder applies the received values to Equation (1) to obtain outputs $\text{Output}_1$ and $\text{Output}_2$ as follows.

$$\text{Output}_1 = \alpha_1^* R_1 + \alpha_2 R_2^* = (|\alpha_1|^2 + |\alpha_2|^2) S_1$$

$$\text{Output}_2 = \alpha_2^* R_2 + \alpha_1 R_1^* = (|\alpha_1|^2 + |\alpha_2|^2) S_1 \qquad (1)$$

Therefore, according to the "STTD", it is possible to perform a maximum ratio combining for the fading vectors $\alpha_1$ and $\alpha_2$ by using the symbols $S_1$ and $S_2$, as given by Equation (1).

Figure 12:
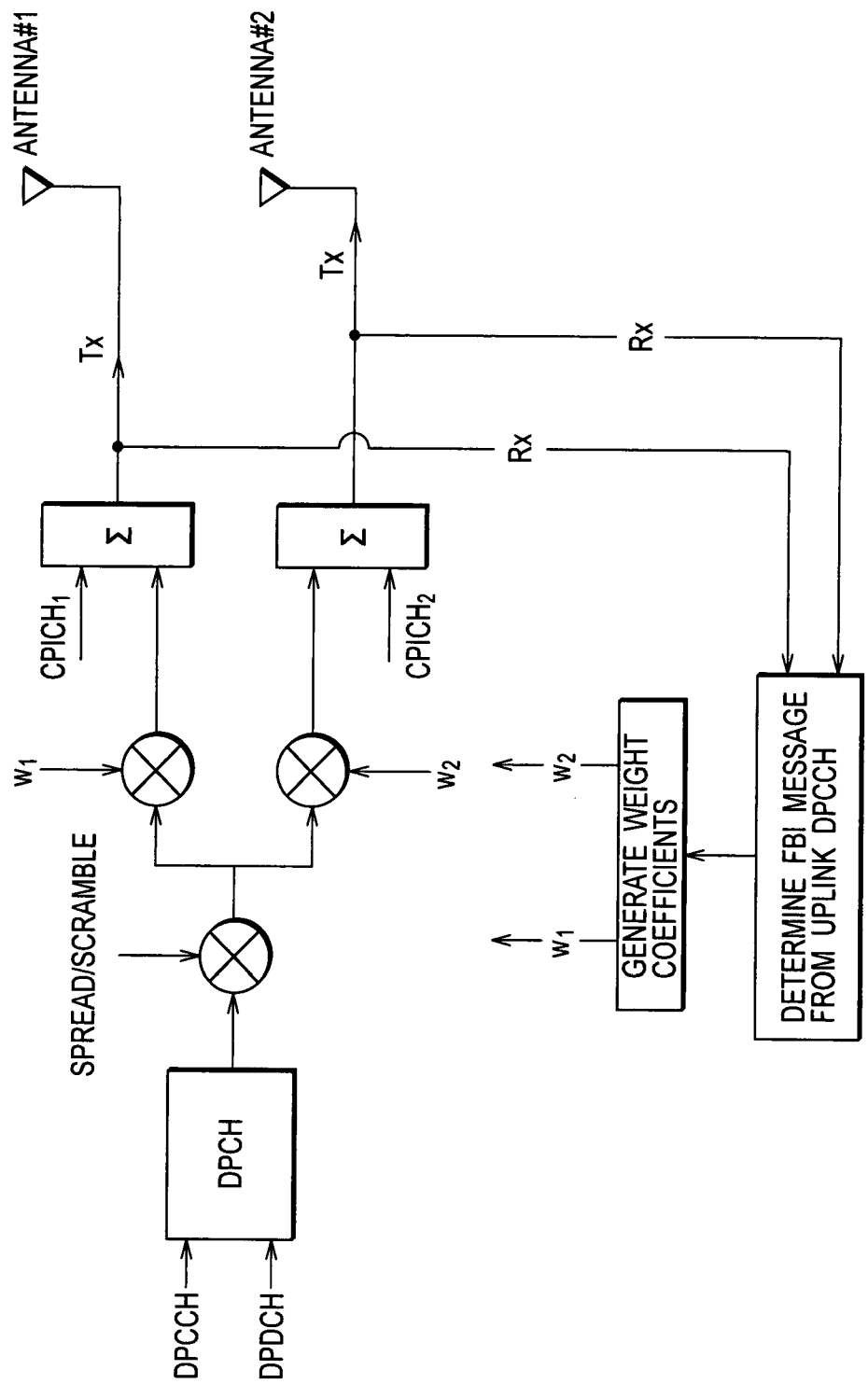
FIG. 12 is a diagram of the general configuration of the mobile communication system to which "CL TxDIV" is applied.

On the other hand, FIG. 12 shows the block configuration of a transmitter (e.g., the base station Node-B) in which a closed loop transmission diversity is applied to a DPCH. In this instance, channel coding, interleaving and spread take place as in the case where the transmission diversity is not applied.

As shown in FIG. 12, the transmitter multiplies a spread complex signal by complex antenna weights $w_1$ and $w_2$, so as to control the phases or amplitudes of the antennas #1 and #2.

Herein, the antenna weights $w_1$ and $w_2$ are selected by a receiver (e.g., the mobile station UE), and are transmitted to the transmitter (e.g., the base station Node-B) by using D bit in an FBI field on the uplink DPCCH.

Incidentally, the closed loop transmission diversity includes two modes. FIG. 13 gives specifications of the modes. In FIG. 13, NFBD denotes the number of FBI bits in a slot, $N_W$ denotes an FB signal message length, $N_{po}$ denotes the number of phase bits that exist in each FB signal message, and $N_{ph}$ denotes the number of amplitude bits that exist in each FB signal message.

In addition, by using a CPICH, the mobile station UE estimates the propagation paths from two transmitting antennas, selects a combination of antenna weight vectors W (W= ($w_1$,$w_2$)) so as to maximize reception power, and thus determines a feedback signaling message (FSM) for providing feedback information (FBI) containing the selected combination.

Next, specific description will be provided with regard to whether the "STTD" should be used for the E-RGCH, the E-HICH and the E-AGCH, when "CL TxDIV" is used for the DPCH.

The E-RGCH, the E-HICH and the E-AGCH are transmitted at transmission time intervals TTI of 2 ms, which are shorter than transmission time intervals TTI of 10 to 40 ms at which typical dedicated channels are transmitted.

When an error occurs in FBI (feedback information) which is notified from the mobile station, a dedicated channel transmitted at intervals TTI of 10 ms can compensate for the error in the FBI, by obtaining the gain of closed loop transmission power from any slot other than a slot where the error in the FBI occurs.

However, the occurrence of the error in the FBI increases the likelihood of the intervals TTI causing a decoding error, because the number of slots contained in a channel transmitted at intervals TTI of 2 ms is only three.

As a result, when the "CL TXDIV" is applied to a channel transmitted at short intervals TTI, the "CL TxDIV" is effective for the channel that requires low quality. However, "OL TxDIV (STTD)" rather than the "CL TxDIV" is used for channels that require relatively high quality, such as the E-RGCH, the E-HICH and the E-AGCH, thereby making it possible to suppress the transmission power.

In addition, the transmission diversity can possibly be turned off for these channels. However, this makes it impossible to equalize outputs from the transmitting antennas and consequently makes it impossible for a transmitting amplifier to operate with efficiency.

As in the case of the mobile communication systems according to the above embodiments, the "STTD" that is an open loop transmission power control is therefore used to obtain diversity gain and thereby enable high-quality reception of each channel, while avoiding the foregoing problems.

While the present invention has been described in detail by referring to specific embodiments, it is obvious to those skilled in the art that this invention is not to be limited to those specific embodiments. It is to be understood that various modifications and changes could be made to the invention without departing from the basic concept and scope of the invention as defined in the appended claims. Accordingly, it is to be understood that the forms of the invention described above are for purposes of illustration only and are not intended to limit the scope of the invention.

INDUSTRIAL APPLICABILITY

As described above, the present invention can provide a mobile communication method, a mobile station and a base station which are designed to specify how a transmission diversity station that implements the EUL should apply a transmission antenna diversity to an E-HICH, an E-RGCH and an E-AGCH.

The invention claimed is:

1. A mobile communication method for transmitting a control signal and a data signal from a base station to a mobile station, comprising the steps of:
    applying a closed loop transmission antenna diversity to a downlink dedicated physical data channel and a downlink dedicated physical control channel; and
    applying an open loop transmission antenna diversity to a downlink dedicated physical control channel only used in enhanced uplink for transmitting individual layer 1 acknowledgement information to each mobile station or a downlink dedicated physical control channel only used in enhanced uplink for transmitting uplink rate assignment information dedicated to at least one mobile station.

2. The mobile communication method according to claim 1, wherein
    the open loop transmission antenna diversity is Space Time block coding based Transmission antenna Diversity.

3. A mobile station configured to receive a control signal and a data signal from a base station wherein
    the mobile station is configured to receive a downlink dedicated physical data channel and a downlink dedicated physical control channel, by applying a closed loop transmission antenna diversity; and
    the mobile station is configured to receive a downlink dedicated physical control channel only used in enhanced uplink for transmitting individual layer-1 acknowledgement information to dedicated to each mobile station or a downlink dedicated physical control channel only used in enhanced uplink for transmitting uplink rate assignment information dedicated to at least one mobile station, by applying an open loop transmission antenna diversity.

4. The mobile station according to claim 3, wherein the open loop transmission antenna diversity is Space Time block coding based Transmission antenna Diversity.

5. A base station for transmitting a control signal and a data signal to a mobile station, wherein
    the base station is configured to transmit a downlink dedicated physical data channel and a downlink dedicated physical control channel, by applying a closed loop transmission antenna diversity, and
    the base station is configured to transmit a downlink dedicated physical control channel only used in enhanced uplink for transmitting layer-1 acknowledgement information dedicated to each mobile station or a downlink dedicated physical control channel only used in enhanced uplink for transmitting uplink rate assignment information dedicated to at least one mobile station, by applying an open loop transmission antenna diversity.

6. The base station according to claim 5, wherein
    the open loop transmission antenna diversity is Space Time block coding based Transmission antenna Diversity.

* * * * *